United States Patent [19]
Fransson et al.

[11] Patent Number: 5,323,610
[45] Date of Patent: Jun. 28, 1994

[54] ARRANGEMENT FOR BEARING LUBRICATION AND COOLING OF A HYDRODYNAMIC COUPLING

[75] Inventors: HÅkan Fransson, Björnlunda; Lars-Olov StrandÅs, Södertälje, both of Sweden

[73] Assignee: Saab-Scania Aktiebolag, Sweden

[21] Appl. No.: 866,189

[22] PCT Filed: Dec. 20, 1990

[86] PCT No.: PCT/SE90/00854

§ 371 Date: Jun. 29, 1992

§ 102(e) Date: Jun. 29, 1992

[87] PCT Pub. No.: WO91/10076

PCT Pub. Date: Jul. 11, 1991

[30] Foreign Application Priority Data

Dec. 29, 1989 [SE] Sweden .................. 8904416

[51] Int. Cl.⁵ ............................................. F16D 33/00
[52] U.S. Cl. ........................................ 60/339; 60/714;
384/473; 184/6.12
[58] Field of Search .................... 60/714, 339, 359;
184/6.12; 74/467; 384/473, 474

[56] References Cited

U.S. PATENT DOCUMENTS

| | | | |
|---|---|---|---|
| 3,053,115 | 9/1962 | Cartwright et al. | 184/6.12 |
| 3,058,296 | 10/1962 | Mischke et al. | |
| 3,136,129 | 6/1964 | Lutze et al. | |
| 3,955,365 | 5/1976 | Arao | |
| 4,516,399 | 5/1985 | Holler et al. | 60/359 |
| 4,950,213 | 8/1990 | Morisawa | 184/6.12 |

FOREIGN PATENT DOCUMENTS

| | | | |
|---|---|---|---|
| 90788 | 1/1967 | France | |
| 0006950 | 1/1981 | Japan | 60/339 |
| 8600665 | 1/1986 | World Int. Prop. O. | |

Primary Examiner—Edward K. Look
Assistant Examiner—Mark Sgantzos
Attorney, Agent, or Firm—Ostrolenk, Faber, Gerb & Soffen

[57] ABSTRACT

Arrangement for effective oil supply to a working chamber in a hydrodynamic coupling flushed through with oil, and lubrication of the bearings of the coupling. The working chamber is supplied with oil through a channel in the stationary part of the coupling via a main bearing forming part of the coupling and bearing the turbine in the pump wheel. A second main bearing bearing the pump wheel in the stationary part receives a continuously limited throughflow of lubricating oil via a throttle in communication with the flow of oil to the first main bearing. By means of the invention, a steady flow of oil to the working chamber of the coupling is obtained, and at the same time all the main bearings receive a continuous throughflow of lubricating oil which does not cause any great oil friction losses in the bearings during stationary running. The invention is advantageously applied to hydrodynamic couplings in internal combustion engine units of the compound type, where a turbine driven by exhaust gas transmits surplus energy from the exhaust gases via the coupling to the crankshaft of the engine.

8 Claims, 3 Drawing Sheets

ARRANGEMENT FOR BEARING LUBRICATION AND COOLING OF A HYDRODYNAMIC COUPLING

The present invention relates to an arrangement for lubricating and cooling the bearings of a hydrodynamic coupling and supplying working liquid to the working chamber thereof. The invention is applied advantageously to internal combustion engine units of the compound type for vehicles, comprising an internal combustion engine, a turbine driven by the engine's exhaust gases, and a transmission arranged between the turbine and a crankshaft issuing from the engine, which transmission comprises a hydrodynamic coupling flushed through with oil.

PRIOR ART

Designers of internal combustion engines have for a long time attempted to obtain, to the greatest possible extent, from the engine's exhaust gases the energy which would otherwise be lost. A customary way of doing this is to equip the engine with a so-called turbocharger consisting of a turbine which is driven by the exhaust and is mechanically coupled to a compressor designed to compress the combustion air for supercharging the engine. Ever since their appearance 40 to 50 years ago, turbochargers have been developed and refined and have thereby attained a high level of adjustability and operational reliability. Nevertheless, a large amount of energy still remains in the exhaust-gases after leaving the turbine.

A method for utilising at least some of this surplus energy is to arrange, in series with and downstream of this first turbine, a second turbine driven by the exhaust gases. If this turbine is in some way coupled so that it transmits mechanically some of the surplus energy to the crankshaft of the engine or to transmissions connected thereto, a turbocompound system is obtained.

Such systems are previously known, for example from U.S. Pat. No. 4,586,337 US Cl. 60-605 and published international patent application 86/00,665 (IPC4 Cl. F02B 41/10,37/00,67/00). These two specifications illustrate exhaust turbines which, via a long shaft and a hydrodynamic coupling, transmit the energy obtained from the exhaust to the front timing gears of a camshaft.

The hydrodynamic coupling is intended to isolate the torsional vibrations occurring in the exhaust turbine from those in the engine. In SAE Transactions Volume 62, pages 276-277, 1954, a turbocompound engine designed for aviation purposes and developed by Curtis-Wright is shown. This 18-cylinder engine has three exhaust gas turbine sections which, via a hydrodynamic coupling, obtain surplus energy and transmit it to a crankshaft. The coupling is fed from the lubricating oil system of the engine and is supplied with oil via its input shaft.

In these turbocompound systems it is important to minimize the losses in the transmission between the exhaust gas turbine and the crankshaft in order to ensure that the surplus energy obtained from the exhaust gases via the turbine will contribute a real additional driving force on the crankshaft. It is preferable to use the lubricating oil of the engine as the drive medium in the hydrodynamic coupling, since bearings in the hydrodynamic coupling can also be lubricated at the same time, and the engine's lubricating oil pump can be used to keep the hydrodynamic coupling filled and continuously flushed for carrying off heat generated in the coupling.

The main bearings in the hydraulic coupling bear, on the one hand, the turbine wheel in the pump wheel and, on the other hand, the stationary part of the coupling in either of the turbine wheel or the pump wheel. Upon steady running, the bearings which bear the turbine wheel in the pump wheel are subjected only to the slip prevailing in the hydraulic coupling between pump wheel and turbine wheel. These bearings which bear the turbine wheel in the pump wheel can therefore be called low-speed bearings, which are subjected to higher speeds only in the event of transient phenomena, especially in the event of instantaneous torque changes on the input shaft to the pump wheel. The bearings which bear either of the pump wheel or turbine wheel in the stationary part of the coupling are continuously subjected, when running, to considerably higher speeds. These bearings can therefore be called high-speed bearings.

The principle of supplying lubricating oil/drive fluid to the working chamber of a hydrodynamic coupling through a stationary part in the coupling via main bearings is known per se from Patent Specifications U.S. Pat. Nos. 3,058,296, 3,136,129 and FR,E,91671. FR,E,91671 illustrates a solution where the coupling's low-speed bearings, bearing the turbine wheel in the pump wheel, are flushed through with oil, which is then conveyed to the working chamber of the coupling. The high-speed bearing, however, is completely without through-flowing lubrication.

In U.S. Pat. Nos. 3,058,296 and 3,136,129 both the high-speed and low-speed bearings are flushed through with all the oil/hydraulic fluid which is to be conveyed to the working chamber of the coupling. If the heat generated in the working chamber of the hydraulic coupling is to be carried off effectively, relatively large flows are required. This results in great losses being created in the high-speed bearings.

OBJECT OF THE INVENTION

An object of the present invention is to provide an effective oil supply to a working chamber in a hydrodynamic coupling flushed through with oil, which oil supply can be adjusted for carrying off the heat generated in the hydraulic coupling.

Another object is to obtain at the same time a lubrication of the bearings of the hydrodynamic coupling using the same oil supply system, which bearings are all designed to be lubricated by a flow of oil passing through them before the main oil flow reaches the working chamber of the hydrodynamic coupling, as a result of which the bearings are lubricated with cooler oil.

A further object is for each bearing to obtain a flow of oil passing through it, which is adapted to the different bearing types in such a way that the friction losses generated in the bearings are kept to the minimum possible level.

In these respects, the arrangement according to the invention is divided for lubricating and cooling the bearings of a hydrodynamic coupling while supplying working fluid in the form of oil/hydraulic fluid to the working chamber of the hydrodynamic coupling. The hydrodynamic coupling is supported in an enclosing external housing. It has a pump wheel which is driven by a motor and a turbine wheel which is driven to rotate by rotation of the pump wheel. Both of the turbine wheel and the pump wheel have respective blades which are in a toric working chamber, as is conventional.

The pump wheel is supported on a first axle which is stationary with respect to the external housing. A pump wheel bearing is on the axle and the pump wheel rotates around the axle. There is an internal housing attached to the pump wheel and extending from the pump wheel around the turbine wheel.

The turbine wheel is connected with and rotates a driven shaft. The turbine wheel driven shaft is inside a turbine wheel bearing. The internal housing for the pump wheel is at the outside of the pump wheel bearing, so that the axle for the pump wheel supports the internal housing for the pump wheel which supports the turbine wheel bearing and the driven shaft. The turbine wheel and its driven shaft rotate with respect to the turbine wheel bearing.

An oil passage through the stationary external housing carries oil to and through the turbine wheel bearing and that oil then passes into the working chamber. The pump wheel bearing is in communication with the space upstream in the oil passage of the turbine wheel bearing via a throttle, which seals off communication to the pump wheel bearing from the flow through the oil passage to only leak a sufficient amount of oil for through flow lubrication of the pump wheel bearing.

Oil in the working chamber is evacuated through an overflow drain in the form of a gap between a sleeve on the driven shaft and an extended part of the pump wheel housing. The gap lies radially inside the working chamber of the coupling.

Further features characterising the invention and advantages thereof will become apparent from an embodiment of the invention illustrated hereinbelow and described in greater detail with reference to the attached figures.

DESCRIPTION OF A PREFERRED EMBODIMENT

Figure 1:
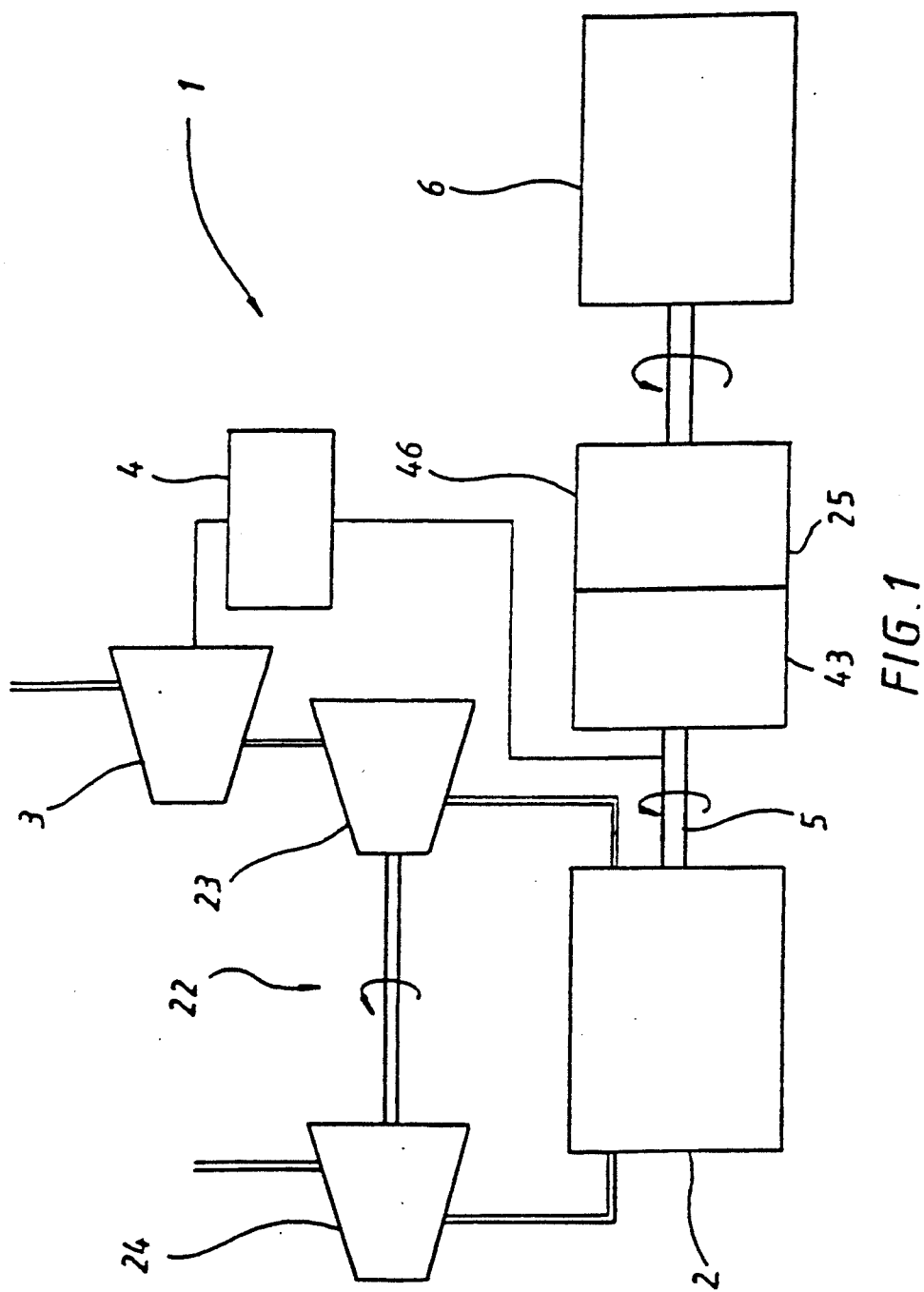
FIG. 1 shows diagrammatically an internal combustion engine unit according to the invention.

FIG. 1 shows diagrammatically an internal combustion engine unit 1 of the turbocompound type comprising an internal combustion engine 2, a turbocharger 22 consisting of an exhaust turbine 23 and, driven by this, a turbo compressor 24 compressing the intake air of the engine 2, a second exhaust gas turbine 3, hereinafter called the power turbine, and a transmission 4 between the power turbine 3 and a crankshaft 5 in the internal combustion engine 2. The crankshaft 5 of the engine 2 drives, via a transmission 46 consisting of a coupling 43 and a gearbox 25, a load 6 in the form of, for example, a heavy land vehicle. The exhaust gases from the engine 2 drive in a first stage the exhaust turbine 23 and thereafter the series-coupled power turbine 3.

Figure 2:
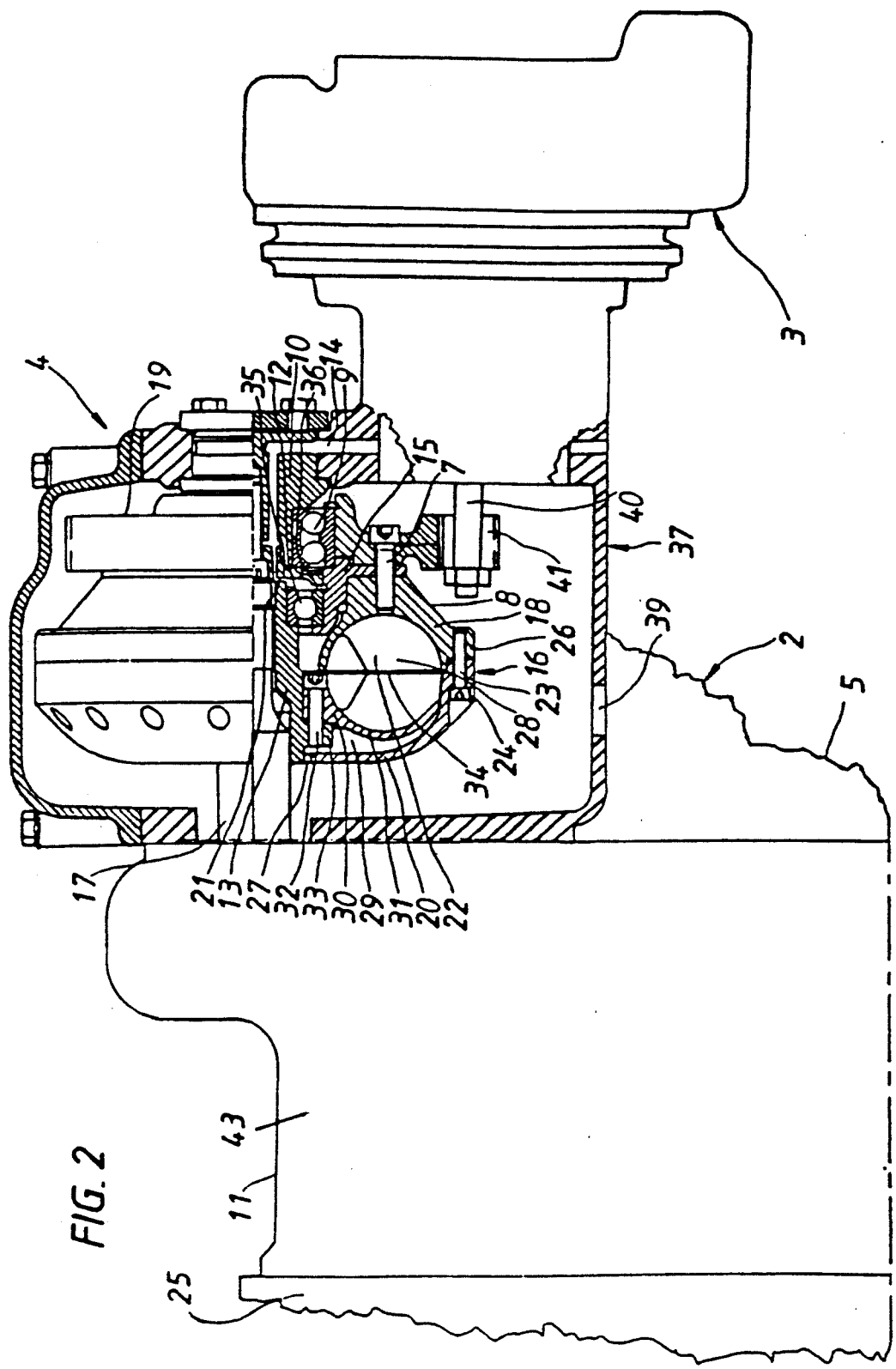
FIG. 2 shows in detail the hydrodynamic coupling according to one embodiment of the invention.
Figure 3:
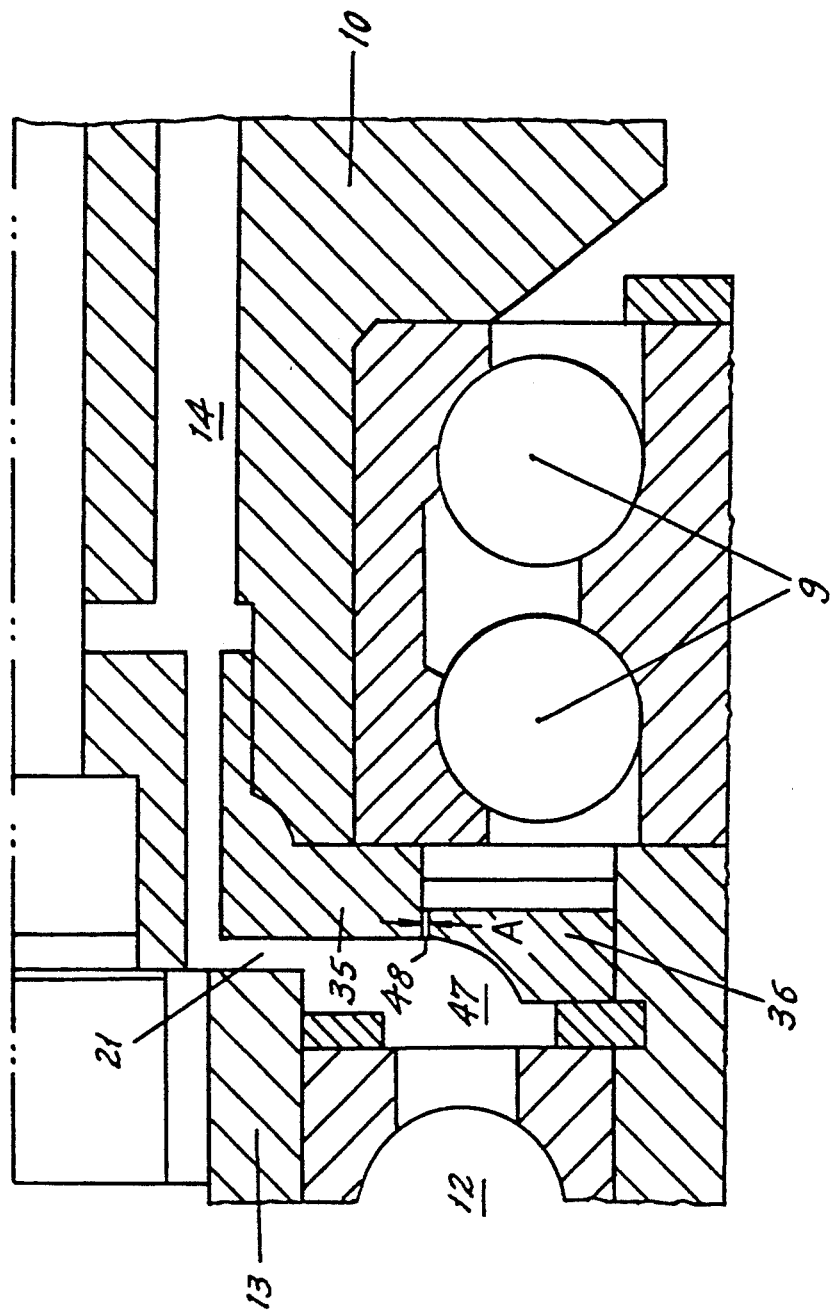
FIG. 3 is a further enlarged detail of FIG. 2.

FIG. 2 shows in detail a hydrodynamic coupling 16 which forms part of the transmission 4. FIG. 3 is a finer detail of that coupling in FIG. 2. The primary side of the coupling 16 is driven by the power turbine 3 via a shaft 40 issuing from the latter and, arranged on this shaft 40, a gear wheel 41. The gear wheel 41 is in engagement with and drives a gear wheel 19 which is secured to and forms part of a pump wheel 8 arranged in the coupling 16. The gear wheel 19 and the pump wheel 8 are journalled on the one hand by a ball bearing 9 in a pump wheel axle or stub axle 10 arranged securely in the coupling housing 37, and on the other hand in a ball bearing system 12, consisting of one or more ball bearings 12, on a sleeve 13 arranged in the coupling 16 on the driven or output shaft 17 of the coupling 16. The output shaft communicates through the coupling 43 in the housing 11 to the gearbox 25. In the housing 37 and in the pump wheel axle or stub axle 10 there runs a channel 14 through which oil from the lubricating system of the engine 2 is conveyed, on the one hand, to bearings (not shown) bearing the shaft 40 and, on the other hand, to the coupling 16. The channel 14 is adjustably throttled by means of a bearing holder washer 35 which holds the pump wheel bearing 9 in place and at the same time forms an adjustable gap 21 between itself and the sleeve 13. The gap 21 is advantageously set so that the oil flow passing through the gap is sufficient to flush through the hydraulic coupling and carry off the heat generated. In an application of a hydrodynamic coupling in a compound system to a six-cylinder internal combustion engine of 400 hp and an oil lubricating system pressure of 3 bar, the necessary flushing is obtained, for carrying off the heat generated, at a flow of a couple of liters per minute. The greater part of this flow then passes the low-speed turbine wheel bearing 12 bearing the turbine wheel in the pump wheel. After the gap 21, the channel 14 opens out into a space 47 upstream of the low-speed turbine wheel bearing 12. The space is sealed off with respect to the high-speed pump wheel bearing 9 by means of a sealing ring 36 which, however, leaks a sufficient amount of oil through throttle gap 48 to lubricate the bearing 9.

As regards the high-speed pump wheel bearing 9, it is important that the oil flow should not become so great that the friction losses in the bearing begin to increase. For a typical spherical ball bearing, a minimum required oil flow for effective lubrication may be about one centilitre per minute. This corresponds to a continuous dampening of the bearing. For this spherical ball bearing, a maximum permissible oil flow may be about 1 liter per minute, and, in the event of the flow exceeding this value, the bearing becomes heavier and hotter and causes great friction losses. The sealing ring 36, which is preferably a steel ring, is ground on its radial inside, leaving a calibrated gap 48 between the sealing ring 36 and another part the bearing holder washer 35. This gap is dimensioned in such a way that a limited oil flow leaks from the space upstream of the low-speed turbine wheel bearing 12 to the high-speed pump wheel bearing 9. The main part of the oil flow first passes the low-speed bearing 12 and lubricates the latter and then reaches the working chamber 34, while a limited subsidiary flow is conveyed to the high-speed bearing 9. The subsidiary flow to the high-speed bearing is suitably adapted so that the high-speed bearing obtains a flow which lies within the permissible minimum and maximum flow range for the bearing type in question, with margins in respect of both the minimum and maximum flow limits.

The pump wheel 8 forms a unit together with the gear wheel 19, a bearing holder 15, a blade holder 18 and a casing 20. The gear wheel 19, the bearing holder 15 and the blade holder 18 are held together by a bolted joint 7. The blade holder 18 is made up of a ring with a half-toric form, in which the blades 28 of the primary side are arranged. The casing 20 is secured to the blade holder 18 by bolt connection 23 mounted in holes 38 arranged in flanges 24 and 26, respectively, on the periphery of the casing 20 and blade holder 18, respectively. The casing 20 is arched in such a way that a narrow gap 27 is formed between it and the sleeve 13. There is thus formed in the pump wheel 8 a chamber 29 in which is arranged the secondary side of the coupling 16 in the form of a turbine wheel 30. The turbine wheel 30 consists of said sleeve 13 and a blade holder 31 which is secured in a flange 33 on the sleeve 13 by means of a bolted joint 32. The blade holder 31 is shaped as a ring with an almost half-toric form, in which the blades of the secondary side are arranged. The blade holder 31 is turned towards the blade holder 18 in such a way that together they form a torus-shaped working chamber 34.

Oil is thus conveyed to the coupling 16 through the channel 14 and is forced onwards through the bearing 12 to the working chamber 34. In the pump wheel 8, the oil is set in a circular motion. On account of the centrifugal force, the oil is forced outwards towards the perimeter of the pump wheel 8 and flows from there at a higher speed across to the turbine wheel 30. The flow energy of the oil is converted in the turbine wheel 30 to a mechanical movement of rotation. The oil is maintained in the working chamber 34 on account of the centrifugal force in the coupling, but, when new cool oil is supplied, the heated oil flows round the perimeter of the turbine wheel 30 and sprays out through an overflow drain/the gap 27 which lies radially inside of the working chamber 34 and its pump wheel and turbine wheel 8, 30. The size of the gap 27 determines the rigidity of the coupling. If the gap is made large, with a large internal diameter in the recess in the casing 20, the degree of filling in the working chamber 34 is reduced and the coupling then becomes more flexible. The rigidity of the coupling can thus be adapted simply by dimensioning of the size of the gap. When the coupling is enclosed in a housing 37, the oil is collected in the housing from, on the one hand, the gap 27 and, on the other hand, from the high-speed bearing 9. The oil is then conveyed onwards to an oil sump (not shown) through a drainage hole 39 in the housing 37.

By means of these arrangements, oil can be supplied to the coupling 16 as working medium and to the bearing system 12 of the coupling 16 for lubrication and cooling of the latter. The supply is effected through parts of the coupling 16/coupling housing 37 which do not rotate, and this improves the possibilities of creating leakproof flows of oil to the coupling 16.

We claim:

1. An arrangement for supplying oil to the working chamber in a hydrodynamic coupling which is flushed through with oil and for lubricating the bearings of the coupling with the oil supply, the arrangement comprising:

a stationary part of the coupling, including a stationary pump wheel axle;

a pump wheel bearing supported on the pump wheel axle;

a pump wheel supported on the pump wheel bearing for being rotated around the pump wheel axle; drive means for driving the pump wheel to rotate around the pump wheel axle;

a turbine wheel bearing separate from the pump wheel bearing; the turbine wheel bearing having one side connected with the pump wheel and rotatable therewith;

a turbine wheel, a driven shaft connected with the turbine wheel for being rotated by rotation of the turbine wheel; the turbine wheel bearing having another side connected with the turbine wheel and rotatable therewith, such that the turbine wheel at the turbine wheel bearing can rotate with respect to the pump wheel at the turbine wheel bearing;

the pump wheel and the turbine wheel together defining an enclosed working chamber, respective blades on the pump wheel and respective blades on the turbine wheel in the working chamber and positioned so that with the presence of oil in the working chamber, rotation of the pump wheel and the blades thereof in turn rotates the turbine wheel blades which rotates the turbine wheel and the driven shaft;

a channel in the stationary part and a space in the coupling between the channel and the turbine wheel bearing, the channel being for delivery of lubricating oil to the wheel bearings and the working chamber, the turbine wheel bearing and the space in the coupling communicating to the working chamber so that a main part of the flow of oil passes the turbine wheel bearing and enters the working chamber;

a throttle between the space in the coupling and the pump wheel bearing, the throttle being for limiting a second part of the flow of oil that is passing from the space through the pump wheel bearing so that the second part of the flow of oil is only a sufficient amount of oil passed to the pump wheel bearing for through flow lubrication of the pump wheel bearing.

2. The arrangement of claim 1, wherein the pump wheel axle and the turbine wheel driven shaft are coaxial.

3. The arrangement of claim 2, wherein the pump wheel bearing is on the outside of the stationary pump wheel axle and the pump wheel engages the pump wheel bearing on the outside of the pump wheel axle; the turbine wheel bearing being outside the driven shaft and the pump wheel engaging the turbine wheel axle outside of the turbine wheel bearing.

4. The arrangement of claim 1, further comprising the pump wheel including a pump wheel enclosure which extends past the pump wheel, past the working chamber and past the blades of the turbine wheel and extends approximately to the driven shaft of the turbine wheel;

an overflow drain comprising a gap between the driven shaft and the pump wheel enclosure, the gap being located generally radially inward of the working chamber of the coupling, which is around and generally outward of the driven shaft.

5. The arrangement of claim 4, wherein the stationary part includes an enclosing housing which encloses the working chamber, the housing is shaped to collect oil from the overflow drain and to collect oil flushed through the pump bearing.

6. The arrangement of claim 5, further comprising a hole in the enclosing housing through which the collected oil can pass out of the housing.

7. The arrangement of claim 1, wherein the throttle comprises a bearing holder washer for the pump wheel bearing and a part co-rotating with the pump wheel being respectively sized so that the throttle is defined between them.

8. An internal combustion engine having a crankshaft, the engine producing energy and generating exhaust gases; the engine including a power turbine and means connected from the engine to the power turbine for causing the exhaust gases to drive the power turbine;

the arrangement in a hydrodynamic coupling of claim 1 being disposed between the power turbine of the engine and the crankshaft of the engine for transmitting the rotation energy of the power turbine to the crankshaft;

the engine having an oil supply system, the oil supply system being connected with the channel of the arrangement.

* * * * *